(12) United States Patent
Gaskell et al.

(10) Patent No.: US 11,898,874 B2
(45) Date of Patent: Feb. 13, 2024

(54) GYROSCOPE BIAS ESTIMATION

(71) Applicant: McLaren Applied Technologies Limited, Woking (GB)

(72) Inventors: Matthew A. Gaskell, London (GB); Nicholas H. Reddall, London (GB)

( * ) Notice: Subject to any disclaimer, the term of this patent is extended or adjusted under 35 U.S.C. 154(b) by 0 days.

(21) Appl. No.: 17/754,961

(22) PCT Filed: Oct. 15, 2020

(86) PCT No.: PCT/IB2020/059716
§ 371 (c)(1),
(2) Date: Apr. 18, 2022

(87) PCT Pub. No.: WO2021/074851
PCT Pub. Date: Apr. 22, 2021

(65) Prior Publication Data
US 2022/0364882 A1    Nov. 17, 2022

(30) Foreign Application Priority Data
Oct. 18, 2019   (GB) ..................................... 1915137

(51) Int. Cl.
G01C 25/00    (2006.01)
G01C 19/5776    (2012.01)

(52) U.S. Cl.
CPC ....... G01C 25/005 (2013.01); G01C 19/5776 (2013.01)

(58) Field of Classification Search
CPC .. G01C 25/005; G01C 19/5776; G01C 19/00; G01C 21/188; G01C 19/04; G01C 19/34
See application file for complete search history.

(56) References Cited

U.S. PATENT DOCUMENTS 2,012,755 A    8/1935   Muth
2,371,978 A    3/1945   Perham
(Continued)

FOREIGN PATENT DOCUMENTS

AU    201616964 S    1/2017
AU    201616965 S    1/2017
(Continued)

OTHER PUBLICATIONS

Plethy, "Webpage", https://www.plethy.com/, 2020, 5 pages.
(Continued)

*Primary Examiner* — Natalie Huls
*Assistant Examiner* — Cynthia L Davis
(74) *Attorney, Agent, or Firm* — Howard & Howard Attorneys PLLC

(57) ABSTRACT

A method for determining a current estimated gyroscope bias of a gyroscope configured to output rotation rate data includes receiving first rotation rate data associated with a first time from the gyroscope, the first rotation rate data comprising a first rotation rate reading that indicates a rotation rate of the gyroscope about a first axis; calculating a rotation rate moving average and a rotation rate moving average associated with a second time earlier than the first time; calculating a moving standard deviation based on the first rotation rate data, and a moving standard deviation associated with the second time; determining if the moving standard deviation associated with the first time is less a threshold moving standard deviation; and in response the moving standard deviation being less than the threshold moving standard deviation, using the first rotation rate reading to update the current estimated gyroscope bias.

18 Claims, 2 Drawing Sheets

(56) References Cited

U.S. PATENT DOCUMENTS

| | | |
|---|---|---|
| 2,747,248 A | 5/1956 | Mercer |
| 3,118,201 A | 1/1964 | Beghetto, Jr. |
| 3,487,836 A | 1/1970 | Benjamin et al. |
| 3,516,409 A | 6/1970 | Robert |
| 3,863,640 A | 2/1975 | Haverstock |
| 3,926,193 A | 12/1975 | Hasson |
| 3,933,158 A | 1/1976 | Haverstock |
| 3,971,384 A | 7/1976 | Hasson |
| 3,972,328 A | 8/1976 | Chen |
| 3,983,878 A | 10/1976 | Kawchitch |
| 4,038,989 A | 8/1977 | Romero-Sierra et al. |
| 4,114,624 A | 9/1978 | Haverstock |
| 4,210,148 A | 7/1980 | Stivala |
| 4,222,383 A | 9/1980 | Schossow |
| 4,224,945 A | 9/1980 | Cohen |
| 4,526,173 A | 7/1985 | Sheehan |
| 4,531,521 A | 7/1985 | Haverstock |
| 4,535,772 A | 8/1985 | Sheehan |
| 4,605,005 A | 8/1986 | Sheehan |
| 4,612,230 A | 9/1986 | Liland et al. |
| 4,676,245 A | 6/1987 | Fukuda |
| 4,780,168 A | 10/1988 | Beisang et al. |
| 4,871,367 A | 10/1989 | Christensen et al. |
| 4,881,546 A | 11/1989 | Kaessmann |
| 4,950,282 A | 8/1990 | Beisang et al. |
| 4,966,605 A | 10/1990 | Thieler |
| 4,976,726 A | 12/1990 | Haverstock |
| 5,176,703 A | 1/1993 | Peterson |
| 5,190,032 A | 3/1993 | Zacoi |
| 5,259,835 A | 11/1993 | Clark et al. |
| 5,306,236 A | 4/1994 | Blumenfeld et al. |
| 5,336,219 A | 8/1994 | Krantz |
| 5,377,695 A | 1/1995 | An Haack |
| 5,485,402 A | 1/1996 | Smith et al. |
| 5,486,196 A | 1/1996 | Hirshowitz et al. |
| 5,514,155 A | 5/1996 | Daneshvar |
| 5,524,637 A | 6/1996 | Erickson |
| 5,533,519 A | 7/1996 | Radke et al. |
| 5,562,705 A | 10/1996 | Whiteford |
| 5,643,187 A | 7/1997 | Næstoft et al. |
| 5,645,077 A | 7/1997 | Foxlin |
| 5,665,108 A | 9/1997 | Galindo |
| 5,725,507 A | 3/1998 | Petrick |
| 5,788,660 A | 8/1998 | Resnik |
| 5,823,983 A | 10/1998 | Rosofsky et al. |
| 5,843,123 A | 12/1998 | Brazeau |
| 5,880,976 A | 3/1999 | DiGioia, III et al. |
| 5,935,171 A | 8/1999 | Schneider et al. |
| 6,007,564 A | 12/1999 | Haverstock |
| 6,024,746 A | 2/2000 | Katz |
| 6,031,454 A | 2/2000 | Lovejoy et al. |
| 6,033,654 A | 3/2000 | Stedronsky et al. |
| 6,059,576 A | 5/2000 | Brann |
| 6,074,965 A | 6/2000 | Bodenschatz et al. |
| 6,126,615 A | 10/2000 | Allen et al. |
| 6,168,569 B1 | 1/2001 | McEwen et al. |
| 6,176,868 B1 | 1/2001 | Detour |
| 6,194,629 B1 | 2/2001 | Bernhard |
| 6,447,448 B1 | 9/2002 | Ishikawa et al. |
| 6,463,310 B1 | 10/2002 | Swedlow et al. |
| 6,483,929 B1 | 11/2002 | Murakami et al. |
| 6,540,707 B1 | 4/2003 | Stark et al. |
| 6,611,783 B2 | 8/2003 | Kelly, Jr. et al. |
| 6,629,949 B1 | 10/2003 | Douglas |
| 6,689,100 B2 | 2/2004 | Connelly et al. |
| 6,726,706 B2 | 4/2004 | Dominguez |
| 6,885,737 B1 | 4/2005 | Gao et al. |
| 6,960,193 B2 | 11/2005 | Rosenberg |
| 7,066,182 B1 | 6/2006 | Dunshee |
| 7,109,859 B2 | 9/2006 | Peeters |
| 7,148,803 B2 | 12/2006 | Bandy et al. |
| 7,152,608 B2 | 12/2006 | Hunter et al. |
| 7,233,872 B2 | 6/2007 | Shibasaki et al. |
| 7,245,254 B1 | 7/2007 | Vogt |
| 7,275,218 B2 | 9/2007 | Petrella et al. |
| 7,328,131 B2 | 2/2008 | Donofrio et al. |
| 7,359,816 B2 | 4/2008 | Kumar et al. |
| 7,361,185 B2 | 4/2008 | O'Malley et al. |
| 7,455,681 B2 | 11/2008 | Wilke et al. |
| 7,460,975 B2 | 12/2008 | David |
| 7,461,972 B2 | 12/2008 | Cohen |
| 7,492,254 B2 | 2/2009 | Bandy et al. |
| 7,511,185 B2 | 3/2009 | Lebner |
| 7,518,504 B2 | 4/2009 | Peeters |
| 7,526,398 B1 | 4/2009 | Choi et al. |
| 7,546,090 B2 | 6/2009 | Sayers |
| 7,641,682 B2 | 1/2010 | Palmaz et al. |
| 7,645,285 B2 | 1/2010 | Cosgrove et al. |
| 7,661,200 B2 | 2/2010 | Bonnet et al. |
| 7,698,830 B2 | 4/2010 | Townsend et al. |
| 7,699,793 B2 | 4/2010 | Gotte et al. |
| 7,725,279 B2 | 5/2010 | Luinge et al. |
| 7,742,995 B2 | 6/2010 | Phillips |
| 7,799,042 B2 | 9/2010 | Williamson, IV et al. |
| 7,877,131 B2 | 1/2011 | Jansen et al. |
| 7,881,761 B2 | 2/2011 | Mannheimer et al. |
| 7,945,461 B2 | 5/2011 | Sekura |
| 7,949,386 B2 | 5/2011 | Buly et al. |
| 7,969,307 B2 | 6/2011 | Peeters |
| 7,981,136 B2 | 7/2011 | Weiser |
| 8,048,007 B2 | 11/2011 | Roy |
| 8,050,313 B2 | 11/2011 | Constantinidis et al. |
| 8,075,449 B2 | 12/2011 | Lee |
| 8,077,042 B2 | 12/2011 | Peeters |
| 8,126,736 B2 | 2/2012 | Anderson et al. |
| 8,165,844 B2 | 4/2012 | Luinge et al. |
| 8,165,901 B2 | 4/2012 | Raymond |
| 8,241,296 B2 | 8/2012 | Wasielewski |
| 8,246,590 B2 | 8/2012 | Hu et al. |
| 8,290,792 B2 | 10/2012 | Sekura |
| 8,323,313 B1 | 12/2012 | Belson et al. |
| 8,342,045 B2 | 1/2013 | Maxwell et al. |
| 8,439,945 B2 | 5/2013 | Belson et al. |
| 8,469,902 B2 | 6/2013 | Dick et al. |
| 8,486,070 B2 | 7/2013 | Morgan et al. |
| 8,509,859 B2 | 8/2013 | Jarosinski et al. |
| 8,588,284 B2 | 11/2013 | Lakkis et al. |
| 8,592,640 B2 | 11/2013 | Zepeda et al. |
| 8,593,286 B2 | 11/2013 | Razoumov et al. |
| 8,663,275 B2 | 3/2014 | O'Malley et al. |
| 8,680,360 B2 | 3/2014 | Greener et al. |
| 8,685,093 B2 | 4/2014 | Anderson et al. |
| 8,731,253 B2 | 5/2014 | Dardenne et al. |
| 8,774,900 B2 | 7/2014 | Buly et al. |
| 8,781,860 B2 | 7/2014 | Escorcia et al. |
| 8,814,754 B2 | 8/2014 | Weast et al. |
| 8,814,877 B2 | 8/2014 | Wasielewski |
| 8,876,830 B2 | 11/2014 | Hodorek et al. |
| 8,888,377 B2 | 11/2014 | Claus et al. |
| 8,988,438 B2 | 3/2015 | Bang et al. |
| 8,989,284 B1 | 3/2015 | Vijayaraghavan et al. |
| 9,008,784 B2 | 4/2015 | Chan et al. |
| 9,031,812 B2 | 5/2015 | Roberts et al. |
| 9,041,538 B2 | 5/2015 | Peeters |
| 9,044,345 B2 | 6/2015 | Warkentine et al. |
| 9,050,086 B2 | 6/2015 | Belson et al. |
| 9,089,328 B2 | 7/2015 | Belson et al. |
| 9,089,760 B2 | 7/2015 | Tropper et al. |
| 9,110,505 B2 | 8/2015 | Mastandrea, Jr. |
| 9,119,569 B2 | 9/2015 | Chen et al. |
| 9,122,670 B2 | 9/2015 | Chabanas et al. |
| 9,158,361 B2 | 10/2015 | Fu et al. |
| 9,179,914 B2 | 11/2015 | Belson et al. |
| 9,220,572 B2 | 12/2015 | Meridew et al. |
| 9,222,801 B2 | 12/2015 | Kim et al. |
| 9,222,810 B1 | 12/2015 | Okandan et al. |
| 9,248,002 B2 | 2/2016 | McCarthy |
| 9,248,049 B2 | 2/2016 | Gurtner et al. |
| 9,265,448 B2 | 2/2016 | Bonnet |
| 9,271,858 B2 | 3/2016 | Ben-Meir et al. |
| 9,295,576 B2 | 3/2016 | Boone et al. |
| 9,311,789 B1 | 4/2016 | Gwin |
| 9,330,239 B2 | 5/2016 | Koduri et al. |
| 9,393,460 B1 | 7/2016 | Emigh |

(56) References Cited

U.S. PATENT DOCUMENTS

| | | |
|---|---|---|
| 9,410,979 B2 | 8/2016 | Yuen et al. |
| 9,420,083 B2 | 8/2016 | Roberts et al. |
| 9,421,448 B2 | 8/2016 | Tropper et al. |
| 9,470,699 B2 | 10/2016 | Peeters |
| 9,474,529 B2 | 10/2016 | Belson et al. |
| 9,532,730 B2 | 1/2017 | Wasielewski |
| 9,554,799 B2 | 1/2017 | Belson et al. |
| 9,554,800 B2 | 1/2017 | Belson et al. |
| 9,561,034 B2 | 2/2017 | Belson et al. |
| 9,585,602 B1 | 3/2017 | Navarro et al. |
| 9,591,997 B2 | 3/2017 | Menzel |
| 9,595,187 B2 | 3/2017 | Kotz et al. |
| 9,600,934 B2 | 3/2017 | Odessky et al. |
| 9,629,583 B2 | 4/2017 | Gradel et al. |
| 9,642,572 B2 | 5/2017 | Mahfouz et al. |
| 9,642,621 B2 | 5/2017 | Belson et al. |
| 9,642,622 B2 | 5/2017 | Belson et al. |
| 9,662,228 B2 | 5/2017 | McCarthy |
| 9,665,686 B2 | 5/2017 | Van Vorhis et al. |
| 9,669,249 B2 | 6/2017 | Marti et al. |
| 9,672,715 B2 | 6/2017 | Roberts et al. |
| 9,693,711 B2 | 7/2017 | Yuen et al. |
| 9,730,617 B2 | 8/2017 | Schlumbohm et al. |
| 9,735,893 B1 | 8/2017 | Aleksov et al. |
| 9,763,581 B2 | 9/2017 | Bonutti et al. |
| 9,786,148 B2 | 10/2017 | Sundaram et al. |
| 9,808,562 B2 | 11/2017 | Wu et al. |
| 9,832,206 B2 | 11/2017 | Mare et al. |
| 9,861,446 B2 | 1/2018 | Lang |
| 9,895,086 B2 | 2/2018 | Van De Laar et al. |
| 9,901,405 B2 | 2/2018 | Valin et al. |
| 9,913,691 B2 | 3/2018 | Brooks |
| 9,916,422 B2 | 3/2018 | Haimerl |
| 9,919,198 B2 | 3/2018 | Romeo et al. |
| 9,924,891 B2 | 3/2018 | Knecht et al. |
| 9,924,921 B1 | 3/2018 | Irish et al. |
| 9,936,877 B2 | 4/2018 | Kotz et al. |
| 9,949,669 B2 | 4/2018 | DiSilvestro et al. |
| 9,949,797 B2 | 4/2018 | Meridew et al. |
| 9,961,547 B1 | 5/2018 | Molina-Markham et al. |
| 9,974,478 B1 | 5/2018 | Brokaw et al. |
| 9,999,378 B2 | 6/2018 | Ronchi et al. |
| 10,004,455 B2 | 6/2018 | Senanayake et al. |
| 10,010,714 B2 | 7/2018 | Coleman et al. |
| 10,013,832 B2 | 7/2018 | Hyde et al. |
| 10,091,748 B2 | 10/2018 | Otomo et al. |
| 10,109,175 B2 | 10/2018 | Roberts et al. |
| 10,123,801 B2 | 11/2018 | Belson et al. |
| 10,126,108 B2 | 11/2018 | Umer et al. |
| 10,135,819 B2 | 11/2018 | Tijerina et al. |
| 10,182,746 B1 | 1/2019 | Demiralp et al. |
| 10,188,322 B2 | 1/2019 | Pijl et al. |
| 10,194,837 B2 | 2/2019 | Kanchan et al. |
| 10,206,627 B2 | 2/2019 | LeBoeuf et al. |
| 10,213,158 B2 | 2/2019 | Fyfe et al. |
| 10,216,904 B2 | 2/2019 | Hughes et al. |
| 10,219,726 B2 | 3/2019 | Wei et al. |
| 10,219,741 B2 | 3/2019 | Stein et al. |
| 10,231,628 B2 | 3/2019 | Guillemaud et al. |
| 10,234,934 B2 | 3/2019 | Connor |
| 10,264,968 B2 | 4/2019 | Gross |
| 10,271,738 B2 | 4/2019 | Peeters |
| 10,271,790 B2 | 4/2019 | Lee |
| 10,314,520 B2 | 6/2019 | Hauenstein et al. |
| 10,321,961 B2 | 6/2019 | McCarthy et al. |
| 10,398,359 B2 | 9/2019 | Dumanyan et al. |
| 10,413,250 B2 | 9/2019 | LeBoeuf et al. |
| 10,415,975 B2 | 9/2019 | Bellusci et al. |
| 10,456,075 B2 | 10/2019 | Auchinleck et al. |
| 10,456,136 B2 | 10/2019 | Belson et al. |
| 10,463,279 B2 | 11/2019 | Chapman et al. |
| 10,531,924 B2 | 1/2020 | Kang et al. |
| 10,561,360 B2 | 2/2020 | Amiot et al. |
| 10,568,550 B2 | 2/2020 | Ronchi et al. |
| 10,575,759 B2 | 3/2020 | Salamatian et al. |
| 10,576,326 B2 | 3/2020 | Vuillerme et al. |
| 10,581,606 B2 | 3/2020 | Liang et al. |
| 10,582,891 B2 | 3/2020 | Wiedenhoefer et al. |
| 10,624,561 B2 | 4/2020 | Foxlin et al. |
| 10,638,970 B2 | 5/2020 | Obma et al. |
| 10,653,339 B2 | 5/2020 | Gaddam et al. |
| 10,702,205 B2 | 7/2020 | Sharman et al. |
| 10,709,377 B2 | 7/2020 | Wiedenhoefer et al. |
| 10,722,145 B2 | 7/2020 | Sundaram et al. |
| 10,796,549 B2 | 10/2020 | Roberts et al. |
| 10,821,047 B2 | 11/2020 | Van Acht et al. |
| 10,828,175 B2 | 11/2020 | Chapman et al. |
| 10,859,597 B2 | 12/2020 | Sheng et al. |
| 10,863,928 B1 | 12/2020 | Mobbs et al. |
| 10,888,269 B2 | 1/2021 | Belson et al. |
| 10,918,332 B2 | 2/2021 | Belson et al. |
| 10,966,788 B2 | 4/2021 | Britton et al. |
| 10,987,029 B1 | 4/2021 | Ikelaar et al. |
| 10,993,639 B2 | 5/2021 | Herr et al. |
| 11,000,229 B2 | 5/2021 | Leavitt et al. |
| 11,045,113 B2 | 6/2021 | Pappe et al. |
| 11,146,604 B2 | 10/2021 | Havekes et al. |
| 11,153,026 B2 | 10/2021 | Pierson et al. |
| 11,179,065 B2 | 11/2021 | Slepian |
| 11,337,649 B2 | 5/2022 | Belson et al. |
| 2002/0099315 A1 | 7/2002 | Lebner |
| 2003/0065294 A1 | 4/2003 | Pickup et al. |
| 2003/0108352 A1 | 6/2003 | Hellman |
| 2003/0120198 A1 | 6/2003 | Barkell et al. |
| 2003/0163160 A1 | 8/2003 | O'Malley et al. |
| 2003/0220596 A1 | 11/2003 | Dunshee |
| 2004/0072964 A1 | 4/2004 | Udding et al. |
| 2004/0106904 A1 | 6/2004 | Gonnelli et al. |
| 2004/0204740 A1 | 10/2004 | Weiser |
| 2004/0210176 A1 | 10/2004 | Diana |
| 2004/0260234 A1 | 12/2004 | Srinivasan et al. |
| 2005/0020957 A1 | 1/2005 | Ebner |
| 2005/0070956 A1 | 3/2005 | Rousseau |
| 2005/0080453 A1 | 4/2005 | Lebner et al. |
| 2005/0085757 A1 | 4/2005 | Santanello |
| 2005/0153090 A1 | 7/2005 | Marchitto et al. |
| 2005/0234332 A1 | 10/2005 | Murphy |
| 2005/0234485 A1 | 10/2005 | Seegert et al. |
| 2005/0277959 A1 | 12/2005 | Cosgrove et al. |
| 2005/0284801 A1 | 12/2005 | Tacklind |
| 2006/0030886 A1 | 2/2006 | Clark |
| 2006/0122522 A1 | 6/2006 | Chavan et al. |
| 2006/0200198 A1 | 9/2006 | Riskin et al. |
| 2006/0259033 A1 | 11/2006 | Nesbitt |
| 2006/0271320 A1 | 11/2006 | Kumar et al. |
| 2006/0277023 A1 | 12/2006 | Maiti et al. |
| 2007/0026078 A1 | 2/2007 | Almarsson et al. |
| 2007/0032748 A1 | 2/2007 | McNeil et al. |
| 2007/0038247 A1 | 2/2007 | Lebner et al. |
| 2007/0078366 A1 | 4/2007 | Haggstrom et al. |
| 2007/0088339 A1 | 4/2007 | Luchetti |
| 2007/0106277 A1 | 5/2007 | Hood et al. |
| 2007/0141130 A1 | 6/2007 | Villanueva et al. |
| 2007/0169364 A1 | 7/2007 | Townsend et al. |
| 2007/0179419 A1 | 8/2007 | Simpson |
| 2007/0179626 A1 | 8/2007 | de la Barrera et al. |
| 2007/0185432 A1 | 8/2007 | Etheredge et al. |
| 2007/0260278 A1 | 11/2007 | Wheeler et al. |
| 2008/0033334 A1 | 2/2008 | Gurtner et al. |
| 2008/0081951 A1 | 4/2008 | Frasier et al. |
| 2008/0103550 A1 | 5/2008 | Wenzel et al. |
| 2008/0114396 A1 | 5/2008 | Cory et al. |
| 2008/0147115 A1 | 6/2008 | O'Malley et al. |
| 2008/0161731 A1 | 7/2008 | Woods et al. |
| 2008/0228219 A1 | 9/2008 | Weiser |
| 2008/0281555 A1 | 11/2008 | Godin et al. |
| 2008/0287864 A1 | 11/2008 | Rosenberg |
| 2009/0023391 A1 | 1/2009 | Falck |
| 2009/0036922 A1 | 2/2009 | Riskin et al. |
| 2009/0062531 A1 | 3/2009 | Kanda |
| 2009/0099496 A1 | 4/2009 | Heegaard et al. |
| 2009/0118649 A1 | 5/2009 | Cabrera et al. |
| 2009/0149869 A1 | 6/2009 | Dolhun |
| 2009/0158131 A1 | 6/2009 | Choi et al. |

(56) References Cited

U.S. PATENT DOCUMENTS

| | | |
|---|---|---|
| 2009/0162531 A1 | 6/2009 | Nesbitt |
| 2009/0177225 A1 | 7/2009 | Nunez et al. |
| 2009/0177227 A1 | 7/2009 | Warren |
| 2009/0204031 A1 | 8/2009 | McNames et al. |
| 2009/0264709 A1 | 10/2009 | Blurton et al. |
| 2009/0299255 A1 | 12/2009 | Kazala, Jr. et al. |
| 2009/0299257 A1 | 12/2009 | Long et al. |
| 2009/0299303 A1 | 12/2009 | Seegert |
| 2010/0010380 A1 | 1/2010 | Panken et al. |
| 2010/0023074 A1 | 1/2010 | Powers et al. |
| 2010/0036209 A1 | 2/2010 | Ferren et al. |
| 2010/0063508 A1 | 3/2010 | Borja et al. |
| 2010/0100011 A1 | 4/2010 | Roche |
| 2010/0100022 A1 | 4/2010 | Greener et al. |
| 2010/0121286 A1 | 5/2010 | Locke et al. |
| 2010/0127879 A1 | 5/2010 | Hotokebuchi et al. |
| 2010/0191088 A1 | 7/2010 | Anderson et al. |
| 2010/0191100 A1 | 7/2010 | Anderson et al. |
| 2010/0228287 A1 | 9/2010 | Jeekel et al. |
| 2011/0028865 A1 | 2/2011 | Luinge et al. |
| 2011/0077667 A1 | 3/2011 | Singhatat et al. |
| 2011/0106026 A1 | 5/2011 | Wu et al. |
| 2011/0118698 A1 | 5/2011 | Eckhoff et al. |
| 2011/0144470 A1 | 6/2011 | Mazar et al. |
| 2011/0172820 A1* | 7/2011 | Kim .................. G01C 25/005 700/254 |
| 2011/0213275 A1 | 9/2011 | Boos et al. |
| 2011/0218458 A1 | 9/2011 | Valin et al. |
| 2011/0270132 A1 | 11/2011 | Mezghani et al. |
| 2011/0313327 A1 | 12/2011 | Van Acht et al. |
| 2012/0029266 A1 | 2/2012 | Holmes et al. |
| 2012/0053594 A1 | 3/2012 | Pelletier et al. |
| 2012/0089258 A1* | 4/2012 | Wong .................. D06F 37/225 312/228 |
| 2012/0095502 A1 | 4/2012 | Bargon et al. |
| 2012/0116485 A1 | 5/2012 | Burgmann |
| 2012/0203273 A1 | 8/2012 | Riskin et al. |
| 2012/0221044 A1 | 8/2012 | Archibald et al. |
| 2012/0226214 A1 | 9/2012 | Gurtner et al. |
| 2012/0232587 A1 | 9/2012 | Burke et al. |
| 2012/0278095 A1 | 11/2012 | Homchowdhury et al. |
| 2013/0066365 A1 | 3/2013 | Belson et al. |
| 2013/0072969 A1 | 3/2013 | Zhang |
| 2013/0108352 A1 | 5/2013 | Ruiz, Sr. et al. |
| 2013/0178897 A1 | 7/2013 | Wu et al. |
| 2013/0185310 A1 | 7/2013 | De Guise et al. |
| 2013/0211259 A1 | 8/2013 | Komistek et al. |
| 2013/0217998 A1 | 8/2013 | Mahfouz et al. |
| 2013/0267928 A1 | 10/2013 | Imran et al. |
| 2013/0281885 A1 | 10/2013 | Rowbottom et al. |
| 2013/0281981 A1 | 10/2013 | Shamir Lebovitz |
| 2013/0282049 A1 | 10/2013 | Peterson et al. |
| 2013/0310711 A1 | 11/2013 | Wang et al. |
| 2013/0331757 A1 | 12/2013 | Belson |
| 2014/0074156 A1 | 3/2014 | Belson et al. |
| 2014/0085050 A1 | 3/2014 | Luna |
| 2014/0171849 A1 | 6/2014 | Fischell et al. |
| 2014/0222070 A1 | 8/2014 | Belson et al. |
| 2014/0257141 A1 | 9/2014 | Giuffrida et al. |
| 2014/0277526 A1 | 9/2014 | Stein et al. |
| 2014/0278229 A1 | 9/2014 | Hong et al. |
| 2014/0316323 A1 | 10/2014 | Kanevsky et al. |
| 2015/0022362 A1 | 1/2015 | Lucas et al. |
| 2015/0045700 A1 | 2/2015 | Cavanagh et al. |
| 2015/0105423 A1 | 4/2015 | Haudenschild et al. |
| 2015/0106024 A1 | 4/2015 | Lightcap |
| 2015/0148653 A1 | 5/2015 | Fleig et al. |
| 2015/0209563 A1 | 7/2015 | Amir |
| 2015/0216527 A1 | 8/2015 | Belson et al. |
| 2015/0309535 A1 | 10/2015 | Connor |
| 2015/0313593 A1 | 11/2015 | Patenaude |
| 2015/0327778 A1 | 11/2015 | Bonutti et al. |
| 2015/0332004 A1 | 11/2015 | Najafi et al. |
| 2015/0351690 A1 | 12/2015 | Toth et al. |
| 2015/0379203 A1 | 12/2015 | Douglass |
| 2016/0007909 A1 | 1/2016 | Singh et al. |
| 2016/0015319 A1 | 1/2016 | Billi et al. |
| 2016/0022015 A1 | 1/2016 | Miller et al. |
| 2016/0045317 A1 | 2/2016 | Lang et al. |
| 2016/0073934 A1 | 3/2016 | Ronchi et al. |
| 2016/0095597 A1 | 4/2016 | Belson et al. |
| 2016/0106931 A1 | 4/2016 | Belson et al. |
| 2016/0114146 A1 | 4/2016 | Belson et al. |
| 2016/0157936 A1 | 6/2016 | Netravali |
| 2016/0202755 A1 | 7/2016 | Connor |
| 2016/0206311 A1 | 7/2016 | Belson et al. |
| 2016/0206312 A1 | 7/2016 | Belson et al. |
| 2016/0206313 A1 | 7/2016 | Belson et al. |
| 2016/0206378 A1 | 7/2016 | Flett et al. |
| 2016/0213924 A1 | 7/2016 | Coleman et al. |
| 2016/0220175 A1 | 8/2016 | Tam et al. |
| 2016/0220252 A1 | 8/2016 | Belson et al. |
| 2016/0242646 A1 | 8/2016 | Obma |
| 2016/0249833 A1 | 9/2016 | Ronchi et al. |
| 2016/0249924 A1 | 9/2016 | Belson et al. |
| 2016/0262685 A1 | 9/2016 | Wagner et al. |
| 2016/0278868 A1 | 9/2016 | Berend et al. |
| 2016/0296149 A1 | 10/2016 | Polsky et al. |
| 2016/0302721 A1 | 10/2016 | Wiedenhoefer et al. |
| 2016/0310140 A1 | 10/2016 | Belson et al. |
| 2016/0324447 A1 | 11/2016 | Hallberg |
| 2016/0324461 A1 | 11/2016 | Hallberg |
| 2016/0338621 A1 | 11/2016 | Kanchan et al. |
| 2016/0338644 A1 | 11/2016 | Connor |
| 2017/0000386 A1 | 1/2017 | Salamatian et al. |
| 2017/0010667 A1 | 1/2017 | Tanaka et al. |
| 2017/0029611 A1 | 2/2017 | Amano |
| 2017/0042541 A1 | 2/2017 | Belson et al. |
| 2017/0055896 A1 | 3/2017 | Al-Ali et al. |
| 2017/0095693 A1 | 4/2017 | Chang et al. |
| 2017/0119475 A1 | 5/2017 | McCabe et al. |
| 2017/0128135 A1 | 5/2017 | McCarthy et al. |
| 2017/0143341 A1 | 5/2017 | Belson et al. |
| 2017/0147789 A1 | 5/2017 | Wiedenhoefer et al. |
| 2017/0156664 A1 | 6/2017 | Belson et al. |
| 2017/0188264 A1 | 6/2017 | Hwang et al. |
| 2017/0188875 A1 | 7/2017 | Banet et al. |
| 2017/0196507 A1 | 7/2017 | Singh et al. |
| 2017/0202682 A1 | 7/2017 | McCarthy |
| 2017/0238849 A1 | 8/2017 | Chapman et al. |
| 2017/0245872 A1 | 8/2017 | Rock et al. |
| 2017/0265800 A1 | 9/2017 | Auchinleck et al. |
| 2017/0273601 A1 | 9/2017 | Wang et al. |
| 2017/0281054 A1 | 10/2017 | Stever et al. |
| 2017/0281074 A1 | 10/2017 | D'Lima et al. |
| 2017/0296115 A1 | 10/2017 | Mahfouz et al. |
| 2017/0329933 A1 | 11/2017 | Brust et al. |
| 2017/0337349 A1 | 11/2017 | Cronin |
| 2017/0367644 A1 | 12/2017 | Sharman et al. |
| 2018/0096111 A1 | 4/2018 | Wells et al. |
| 2018/0125365 A1 | 5/2018 | Hunter et al. |
| 2018/0130373 A1 | 5/2018 | Bernard-Paroly et al. |
| 2018/0147016 A1 | 5/2018 | Valin et al. |
| 2018/0160966 A1 | 6/2018 | Inan et al. |
| 2018/0161101 A1 | 6/2018 | Barsoum et al. |
| 2018/0261316 A1 | 9/2018 | Spooner et al. |
| 2018/0275859 A1 | 9/2018 | Hodge |
| 2018/0279919 A1 | 10/2018 | Bansbach et al. |
| 2018/0289313 A1 | 10/2018 | Inan et al. |
| 2018/0315247 A1 | 11/2018 | Van Andel |
| 2018/0317813 A1 | 11/2018 | Hall et al. |
| 2019/0009133 A1 | 1/2019 | Mettler May |
| 2019/0019578 A1 | 1/2019 | Vaccaro |
| 2019/0038187 A1 | 2/2019 | Latella, Jr. |
| 2019/0038225 A1 | 2/2019 | Leavitt et al. |
| 2019/0060128 A1 | 2/2019 | Belson |
| 2019/0111327 A1 | 4/2019 | Mochizuki |
| 2019/0117121 A1 | 4/2019 | Kutina et al. |
| 2019/0117156 A1 | 4/2019 | Howard et al. |
| 2019/0117312 A1 | 4/2019 | Britton et al. |
| 2019/0133693 A1 | 5/2019 | Mahfouz |
| 2019/0148001 A1 | 5/2019 | Hughes et al. |
| 2019/0224528 A1 | 7/2019 | Omid-Zohoor et al. |
| 2019/0282126 A1 | 9/2019 | Kord |

(56) References Cited

U.S. PATENT DOCUMENTS

| | | | |
|---|---|---|---|
| 2019/0290198 A1 | 9/2019 | Belson et al. | |
| 2019/0293404 A1 | 9/2019 | Abad et al. | |
| 2019/0298253 A1 | 10/2019 | Hal | |
| 2019/0307983 A1 | 10/2019 | Goldman | |
| 2019/0350522 A1 | 11/2019 | Bailey et al. | |
| 2019/0388025 A1 | 12/2019 | Hunter | |
| 2020/0016044 A1 | 1/2020 | Rodrigues et al. | |
| 2020/0046263 A1 | 2/2020 | Hauenstein et al. | |
| 2020/0046264 A1 | 2/2020 | Chapman et al. | |
| 2020/0054275 A1 | 2/2020 | Kim et al. | |
| 2020/0061415 A1 | 2/2020 | Tropper et al. | |
| 2020/0160044 A1 | 5/2020 | Sur et al. | |
| 2020/0215324 A1 | 7/2020 | Mantovani et al. | |
| 2020/0221974 A1 | 7/2020 | Singh | |
| 2020/0237291 A1 | 7/2020 | Sundaram et al. | |
| 2020/0260993 A1 | 8/2020 | Ronchi et al. | |
| 2020/0269091 A1 | 8/2020 | Liu et al. | |
| 2020/0289889 A1 | 9/2020 | Hacking et al. | |
| 2020/0335222 A1 | 10/2020 | Winterbach et al. | |
| 2020/0337629 A1 | 10/2020 | Wiedenhoefer et al. | |
| 2020/0346072 A1 | 11/2020 | Shah | |
| 2020/0349859 A1 | 11/2020 | Shah | |
| 2020/0405195 A1 | 12/2020 | Liu et al. | |
| 2020/0408528 A1* | 12/2020 | Bobye | G01C 21/20 |
| 2021/0045641 A1 | 2/2021 | Al-Ali et al. | |
| 2021/0050098 A1 | 2/2021 | Sterner et al. | |
| 2021/0059564 A2 | 3/2021 | Kutina et al. | |
| 2021/0076981 A1 | 3/2021 | Hacking et al. | |
| 2021/0090419 A1 | 3/2021 | Roberts et al. | |
| 2021/0113150 A1 | 4/2021 | Belson et al. | |
| 2021/0161613 A1 | 6/2021 | Poltaretskyi et al. | |
| 2021/0162262 A1 | 6/2021 | Lee | |
| 2021/0227689 A1 | 7/2021 | Kimoto | |
| 2021/0251574 A1 | 8/2021 | Halter et al. | |
| 2021/0290398 A1 | 9/2021 | Roche | |
| 2021/0375423 A1 | 12/2021 | Levy | |
| 2021/0386292 A1 | 12/2021 | Hunter et al. | |
| 2022/0006557 A1 | 1/2022 | Pierson et al. | |
| 2022/0008225 A1 | 1/2022 | Gross et al. | |
| 2022/0051767 A1 | 2/2022 | Tikka | |
| 2022/0364883 A1 | 11/2022 | Bui et al. | |

FOREIGN PATENT DOCUMENTS

| | | |
|---|---|---|
| AU | 201616966 S | 1/2017 |
| AU | 2014253670 B2 | 11/2019 |
| CN | 1126430 A | 7/1996 |
| CN | 1442119 A | 9/2003 |
| CN | 1524507 A | 9/2004 |
| CN | 101938944 A | 1/2011 |
| CN | 202537562 U | 11/2012 |
| CN | 102946812 A | 2/2013 |
| CN | 104755033 A | 7/2015 |
| CN | 104825200 A | 8/2015 |
| CN | 109163721 A | 1/2019 |
| DE | 102015100795 A1 | 7/2016 |
| EP | 1600108 A2 | 11/2005 |
| EP | 2057944 A1 | 5/2009 |
| EP | 2768119 A2 | 8/2014 |
| EP | 3139835 B1 | 10/2020 |
| GB | 1401877 A | 8/1975 |
| GB | 2574075 B | 7/2020 |
| JP | 362243557 A | 10/1987 |
| JP | H07502913 A | 3/1995 |
| JP | 2001149485 A | 6/2001 |
| JP | 2005512678 A | 5/2005 |
| JP | 2005532134 A | 10/2005 |
| JP | 2010504835 A | 2/2010 |
| JP | 2013515417 A | 5/2013 |
| JP | 2013538603 A | 10/2013 |
| JP | 2018057527 A | 4/2018 |
| WO | 8401805 A1 | 5/1984 |
| WO | 9629013 A1 | 9/1996 |
| WO | 2000038571 A1 | 7/2000 |
| WO | 0110508 A1 | 2/2001 |
| WO | 03053296 A1 | 7/2003 |
| WO | 2004006660 A1 | 1/2004 |
| WO | 2004006782 A1 | 1/2004 |
| WO | 2006124671 A2 | 11/2006 |
| WO | 2007004603 A1 | 1/2007 |
| WO | 2007044647 A2 | 4/2007 |
| WO | 2008019051 A2 | 2/2008 |
| WO | 2008044679 A1 | 4/2008 |
| WO | 2008060532 A2 | 5/2008 |
| WO | 2009066116 A1 | 5/2009 |
| WO | 2010082157 A1 | 7/2010 |
| WO | 2011043786 A1 | 4/2011 |
| WO | 2011139912 A1 | 11/2011 |
| WO | 2011159623 A1 | 12/2011 |
| WO | 2012061438 A2 | 5/2012 |
| WO | 2012061440 A2 | 5/2012 |
| WO | 2013067024 A1 | 5/2013 |
| WO | 2013095716 A1 | 6/2013 |
| WO | 2014066879 A2 | 5/2014 |
| WO | 2014070922 A1 | 5/2014 |
| WO | 2015012887 A1 | 1/2015 |
| WO | 2015103556 A1 | 7/2015 |
| WO | 2015168165 A1 | 11/2015 |
| WO | 2016180438 A1 | 11/2016 |
| WO | 2016180439 A1 | 11/2016 |
| WO | 2017027075 A1 | 2/2017 |
| WO | 2017044120 A1 | 3/2017 |
| WO | 2017088068 A1 | 6/2017 |
| WO | 2017181059 A1 | 10/2017 |
| WO | 2017184825 A1 | 10/2017 |
| WO | 2018081795 A1 | 5/2018 |
| WO | 2018092944 A1 | 5/2018 |
| WO | 2019051564 A1 | 3/2019 |
| WO | 2019068194 A1 | 4/2019 |
| WO | 2019112158 A1 | 6/2019 |
| WO | 2019175899 A1 | 9/2019 |
| WO | 2019224279 A1 | 11/2019 |
| WO | 2019238927 A1 | 12/2019 |
| WO | 202004660 A1 | 1/2020 |
| WO | 2020021271 A1 | 1/2020 |
| WO | 2020046660 A1 | 3/2020 |
| WO | 2020127246 A1 | 6/2020 |
| WO | 2020180916 A1 | 9/2020 |
| WO | 2021048022 A1 | 3/2021 |
| WO | 2021074851 A1 | 4/2021 |
| WO | 2021074852 A1 | 4/2021 |
| WO | 2021074853 A1 | 4/2021 |
| WO | 2021074855 A1 | 4/2021 |
| WO | 2021154885 A2 | 8/2021 |

OTHER PUBLICATIONS

Posteraro, Robert H., "A PACS Education Presentation", Scholar Archive, 2003, 256 pages.

Snijders, M.D., T.E. et al., "Trigonometric Algorithm Defining the True Three-Dimensional Acetabular Cup Orientation", JBJS Open Access, 2018, 9 pages.

Sprigle, PhD, Stephen et al., "Development of a Noninvasive Measure of Pelvic and Hip Angles in Seated Posture", Arch Phys Med Rehabil, vol. 83, 6 pages.

Strive Medtech, "Better Care; Better Outcomes Application," https://apps.apple.com/us/app/strive-orthopedics/id1436221287?form=MY01SV&OCID=MY01SV, 2021, 3 pages.

Strive Medtech, "Webpage", https://strivemedtech.com/, 2021, 4 pages.

Stryker Mako Tha, "Application User Guide", Jun. 2019, 172 pages.

Stryker Mako Tha, "Surgical Guide", Jun. 2019, 82 pages.

Sword Health, "Webpage", https://swordhealth.com, 2021, 7 pages.

Tada, Masahiro et al., "Measurement of Driver Behavior Using Radio Acceleration Sensor Analysis Method", Journal of Institute of Electronics, Information and Communication Engineers D, vol. 91, No. 4, 2008, pp. 1115-1129.

Tamura, Satoru et al., "Hip Range of Motion During Dailty Activities in Patients with Posterior Pelvic Tilt from Supine to Standing Position", Wiley, Feb. 2015, 6 pages.

Tannast, M. et al., "Estimation of Pelvic Tilt on Anteposterior X-Rays—A Comparision of Six Parameters", Skeletal Radiol., vol. 35, 2006, pp. 149-155.

(56) References Cited

OTHER PUBLICATIONS

Tetsunaga. Tomonori et al., "An Accelerometer-Based Navigation System Provides Acetabular Cup Orientation Accuracy Comparable to That of Computed Tomography-Based Navigation During Total Hip Arthroplasty in the Supine Position", Journal ofOrthopaedic Surgery and Research, vol. 15, 2020, 7 pages.
Thakral, Gaurav et al., "Electrical Simulation to Accelerate Wound Healing", CoAction, 2013, vol. 4,, No. 22081, pp. 1-9.
Tracpatch, "Webpage", https://tracpatch.com/blog/the-tracpatch-wearable-device/, 2019, 3 pages.
Trippe, Anthony, "Jawbone vs. Fitbit—A Patent Landscape Report", 2021, 16 pages.
Tyler, Timothy et al., "A New Pelvic Tilt detection Device" Roentgenographic Validation and Application to Assessment of Hip Motion in Professional Ice Hockey Players, Journal of Orthopaedic & Sports Physical Therapy, 1996, 7 pages.
Wang, R.Y. et al., "Measurement of Acetabular Inclination and Anteversion Via CT Generated 3D Pelvic Model", BMC Muscoskeletal Disorders, vol. 18, 2017, 7 pages.
Wyles, Cody, C. et al., "Running Subcuticular Closure Enables the Most tobust Perfusion After TKA: A Randomanized Clinical Trial", Clinical Orthopaedics and Related Research, Springer, Mar. 3, 2015, pp. 1-10.
Xsens, "3D Motion Tracking Webpage", https://www.xsens.com/, 2021, 6 pages.
Yang, M.D., Gyoyue et al., "The Influeence of Pelvic Tilt on the Anteversion Angle of the Acetabular Prosthesis", 2019, 8 pages.
Yi, Chunzhi et al., "Estimating Three--Dimensional body Orientation Based on an Improved Complementary Filter for Human Motion Tracking", MDPI, 2018, 19 pages.
Zhang, Yuxin et al., "Electronic Skin Wearable Sensors for Detecting Lumbar-Pelvic Movements", MDPI, Mar. 2020, 28 pages.
Zimmer Biomet, "My Mobility with Apple Watch Webpage", https://www.zimmerbiomet.com/medical-professionals/zb-edge/mymobility.html, 2021, 7 pages.
Zipline Medical, Inc., "Zip Surgical Skin Closure Webpage", accessed Aug. 17, 2016, http://www.ziplinemedical.com/products/zip-surgical-skin-closure/, 2 pages.
English language abstract for WO 20200046660 A1 extracted from espacenet.com database on Jul. 27, 2022, 2 pages.
English language abstract only (original document unavailable) for AU 201616966 S extracted from espacenet.com database on May 4, 2022, 1 page.
Esposito, PhD, Christina I. et al., "Does Degenerative Lumbar Spine Disease Influence Femoroacetabular Flexion in Patients Undergoing Total Hip Arthroplasy?", Ciin. Orthop. Relat. Res., vol. 474, 2016, pp. 1788-1797.
Fischer, Maximilian C.M. et al., "Relationship Between Pelvic Morphology and Functional Parameters in Standing Position for Patient Specific Cup Planning in THA", CAOS, 17th Annual Meeting of the International Society for Computer Assisted Orthopaedic Surgery, 2017, pp. 88-92.
Gibbs, Peter et al., "Wearable Conductive Fiber Sensors for Multi-Axis Human Joint Angle Measurements", Journal or Neuroengineering and Rehabilitation, vol. 2, No. 1, Mar. 2, 2005, 18 pages.
Goujon-Pillet, Helene et al., Three-Dimensional Motiions of Trunk and Pelvis During Transfemoral Amputee Gait, Arch. Phys. Med. Rehabil., vol. 89, 2008, pp. 87-94.
Gupta, Rajeev et al., "Posture Recognition For Safe Driving", Third International Conference on Information Processing (ICIIP), 2015, pp. 141-146.
Hinge Health, "Digital MSK Clinic Webpage", https://www.hingehealth.com/, 2021, 9 pages.
Hunter, J., "The Exponentially Weighted Moving Average", Journal of Quality Technology, American Society for Quality Control, vol. 18, No. 4, Oct. 1, 1986, pp. 203-210.
Imai, Norio et al., "Pelvic Flexion Measurement From Lateral Projectioin Radiographs is Clinically Reliable", Clin. Orthop. Relat. Res., vol. 471, 2013, pp. 1271-1276.

Inaba, Yutaka et al., "Preoperative Planing for Implant Placement with Consideration of Pelvic Tilt in Total Hip Arthroplasty: Postoperative Efficacy Evaluation", BMC Muscoskeletal Disorders, vol. 17, 2016, 7 pages.
International Search Report for Application No. PCT/GB2019/052088 dated Oct. 16, 2019, 2 pages.
International Search Report for Application No. PCT/IB2020/059716 dated Jan. 15, 2021, 2 pages.
International Search Report for Application No. PCT/IB2020/059717 dated Jan. 15, 2021, 4 pages.
International Search Report for Application No. PCT/IB2020/059718 dated Jan. 21, 2021, 2 pages.
International Search Report for Application No. PCT/IB2020/059720 dated Mar. 16, 2021, 5 pages.
International Search Report for Application No. PCT/US2010/000430 dated Jul. 30, 2010, 2 pages.
International Search Report for Application No. PCT/US2011/034649 dated Jul. 29, 2011, 1 page.
International Search Report for Application No. PCT/US2011/040213 dated Oct. 21, 2011, 2 pages.
International Search Report for Application No. PCT/US2012/062820 dated Mar. 19, 2013, 2 pages.
International Search Report for Application No. PCT/US2013/067563 dated Feb. 6, 2014, 2 pages.
International Search Report for Application No. PCT/US2014/016587 dated Sep. 10, 2014, 2 pages.
International Search Report for Application No. PCT/US2015/010188 dated Apr. 29, 2015, 1 page.
International Search Report for Application No. PCT/US2015/028066 dated Sep. 30, 2015, 1 page.
International Search Report for Application No. PCT/US2015/049671 dated Jan. 12, 2016, 4 pages.
International Search Report for Application No. PCT/US2016/028297 dated Aug. 30, 2016, 2 pages.
International Search Report for Application No. PCT/US2017/027695 dated Jul. 14, 2017, 1 page.
International Search Report for Application No. PCT/US2017/028537 dated Jul. 18, 2017, 1 page.
International Search Report for Application No. PCT/US2017/059286 dated Mar. 6, 2018, 1 page.
Kok, Manon et al., "Using Inertial Sensors for Position and Orientation Estimation" Foundations and Trends in Signal Processing, vol. 11, No. 12, 90 pages.
Lazennec, J.Y. et al., "Lumbar-Pelvic-Femoral Balance on Sitting and Standing Lateral Radiographs", Orthopaedics & Tramatology: Surgery & research, vol. 99S, 2013, pp. S87-S103.
Lazennec, J.Y. et al., "Pelvis and Total Hip Arthroplasty Acetabular Component Orientations in Sitting and Standing Positions: Measurements Reproductivity with EOS Imaging Systems Versus Conventional Radiographies", Orthopaedics & Traumatology Surgery & Research, vol. 97, 2011, pp. 373-380.
Levi, Kemal et al., "Mechanics of Wound Closure: Emerging Tape-Based Wound Closure Technology vs. Traditional Methods", Cureus, Oct. 12, 2016, pp. 1-5.
Lewinnek, George E. et al., "Dislocations After Total Hip-Replacement Arthroplasties", The Journal of Bone and Joint Surgery, 1978, 5 pages.
Luinge, H.J. et al., "Measuring Orientation of Human Body Segments Using Miniature Gyroscopes and Accelerometers", Med. Biol. Eng. Comput., vol. 43, 2005, pp. 273-282.
Machine-assisted English language abstract and machine-assisted English language translation for DE 10 2015 100 795 A1 extracted from espacenet.com database on Aug. 17, 2021, 18 pages.
Madgwick, S. et al., "Estimation of IMU and MARG Orientation Using a Gradient Descent Algorithm", IEE Inernational Conference on Rehabilitation Robotics, Rehab Week Zurich Science City, Switzerland, Jun. 29-Jul. 1, 2011, 7 pages.
Maratt, M.D., Joseph D et al., "Pelvic Tilt in Patients Undergoing Total Hip Arthroplasty: When Does it Matter?", The Journal of Arthroplasty, vol. 30, 2015, pp. 387-391.
Medhab, "Webpage", https://medhab.com/, 2020, 2 pages.
Merriam-Webster, "Definition of integral" accessed on Sep. 13, 2017, https://www.merriam-webter.com/dictionary/integral, 11 pages.

(56) References Cited

OTHER PUBLICATIONS

Merriam-Webster, "Definition of lateral",. http://www.merriam-webster.com/dictionary/lateral, accessed May 5, 2016, .9 pages.
Mjosund, Hanne Leirbekk et al., "Clinically Acceptable Agreement Between the ViMove Wireless Motion Sensor System and the Vicon Motion Capture System When Measuring Lumbar Region inclination Motion in the Sagittal and Coronal Planes", BMCMuscoskeletal Disorders, vol. 18, 2017, 9 pages.
Moes, M.sc., C.C.M., "Measuring the Tilt of the Pelvis", Oct. 19, 1999, 20 pages.
Muvr, Joint Replacement Rehab Application, https://apps.apple.com/us/app/muvr-joint-replacement-rehab/id1088381086?form=MY01SV&OCID=MY01SV, 2021, 3 pages.
Muvr, "Precision Motion Capture Webpage", https://getmuvr.com/, 2021, 2 pages.
My Recovery, "Future Health Works Application," https://apps.apple.com/US/app/myrecovery/id1199952761, 2021, 3 pages.
Nowka, Danny et al., "On Motions That Allow For Identification of Hinge Joint Axes from Kinematic Constraints and 6D IMU Data", https://www.control.tu-berlin.de/wiki/images/b/b3/Nowka2019_ECC.pdf, 2019, 7 pages.
Parcells, Bert, "Cup Placement", Mar. 1, 2017, 9 pages.
Parcells, Bert, "Native Knee Alignment", https://hipandkneebook.com/tja-publication-blog/2017/3/1/knee-basics-native-alignment, Feb. 27, 2017, 4 pages.
Pierrepont, J. et al., "Patient-Specific Component Alignment in Total Hip Arthroplasty", Reconstructive Review, vol. 6, No. 4, Dec. 2016, 11 pages.
Pierrepont, J. et al., "Variation in Functional Pelvic Tilt in Patients Undergoing Total Hip Arthroplasty", The British Editorial Society of Bone & Joint Surgery, 2017, 8 pages.
Abstract of Hunter, J., "The Exponentially Weighted Moving Average", Journal of Quality Technology, American Society for Quality Control, vol. 18, No. 4, Oct. 1, 1986, pp. 203-210, 4 pages.
Abstract of Kobashi, Syoji et al., "Wearable Joint Kinematic Monitoring System Using Inertial and Magnetic Sensors", Mar. 2009, 6 pages.
Abstract of Tada, Masahiro et at., "Detection of Driver's Anomaly Behavior Using Wireless 3D-Accelerometers", Transactions of the Japanese Society for Artificial Intelligence, vol. 23, No. 3, Jan. 2008, pp. 105-116 , 5 pages.
Adchem, "Products Webpage", 2021, http://adchem.com/main/medicalproducts.aspx, 2 pages.
amazon.com, "BodyMedia Fit Wireless LINK Body Monitoring Armband", 1996-2021, 14 pages.
Argentum International, LLC, "K984204—510(k) Premarket Notification Summary, Silverlon Direct Pressure Wound Closure Strip", May 19, 2007. 12 pages.
Aria, "Digital Care Management Platform", 2021, https://think-aria.com/, 5 pages.
Barraza-Madrigal, J.A. et al., "Instantaneous Position and Orientation of the body Segments as an Arbitrary Object in 3D Space by Merging Gyroscope and Accelerometer Information", Articulo De Investigacion, vol. 35, No. 3, Dec. 2014, pp. 241-252.
Bauback, Safa et al., "In Vivo Efficacy Study Showing Comparative Advantage of Bacterial Infection Prevention with Zip-Type Skin Closure Device vs. Subcuticular Sutures", Cureus, Aug. 4, 2018, 3102, pp. 1-11.
Berliner, J.L. et al., "What Preoperative Factors Predict Postoperative Sitting Pelvic Position One Year Following Total Hip Arthroplasty? ", The British Editorial Society of Bone & Joint Surgery, 2018, 8 pages.
Blondel, B. et al., "Pelvic Tilt Measurement Before and After Total Hip Arthroplasty", Orthopaedics & Traumatology: Surgery & Research, vol. 95, 2009, pp. 568-572.
Bosch, "BMI160, Small, Low Power Inertial Measurement Unit Data Sheet", https://www.bosch-sensortec.com/media/boschsensortec/downloads/datasheets- /bst-bmi160-ds000.pdf, Nov. 25, 2020, 114 pages.
Carollo, James et al., "Pelvic Tilt and Rotation in Hip Radiographs Can Be Estimated Using Anatomical Landmarks to Avoid Incorrect Clintical Measurements", ORCS, 2014, 5 pages.
Chen, Eduard et al., "Implant Position Calculation for Acetabular Cup Placement Considering Pelvic Lateral Tilt and Inclination", Informa UK Ltd., 2006, 9 pages.
Claris Reflex, "Webpage", https://clarisreflex.com/, 11 pages.
Conzian, "Knees Up Care Webpage", https://www.conzian.com/en/kneesup/, 2020, 10 pages.
Corin, "Remote Patient Monitoring Platform Webpage", https://www.coringroup.com/healthcare-professionals/solutions/corin-rpm/, 2021, 8 pages.
Davis, Ann et al., "Effect of Surgical Incision Closure Device on Skin Perfusion Following Total Ankle Arthroplasty", UF Health, 2017, Postet, 1 page.
dictionary.com, "Definition of "fixed"", Available at http://www.dictionary.com/browse/fixed, accessed on Sep. 13, 2017.
Dorsavi USA, Inc., "ViMove 5.11 User Manual", 2015, 31 pages.
Dorsavi, "ViMove 2 User Manual Version 2.1.5", 2018, 45 pages.
Dorsavi, "Wearable Sensor Technology Webpage", https://www.dorsavi.com/us/en/, 2021, 5 pages.
Eggli, S. et al., "The Value of Preoperative Planning to Total Hip Arthroplasty", University of Bern, Switzerland, The Jouranl of Bone & Joint Surgery, 1997, 9 pages.
English language abstract and machine-assisted English translation for CN 104825200 A extracted from espacenet.com database on May 4, 2022, 38 pages.
English language abstract and machine-assisted English translation for CN 109163721 A extracted from espacenet.com database on Apr. 18, 2022, 31 pages.
English language abstract and machine-assisted English translation for CN 1442119 A extracted from espacenet.com database on May 4, 2022, 7 pages.
English language abstract and machine-assisted English translation for CN 1524507 A extracted from espacenet.com database on May 4, 2022, 7 pages.
English language abstract and machine-assisted English translation for CN 202537562 U extracted from espacenet.com database on May 4, 2022, 5 pages.
English language abstract and machine-assisted English translation for JP 2018-057527 A extracted from espacenet.com database on Apr. 18, 2022, 12 pages.
English language abstract and machine-assisted English translation for WO 2019/112158 A1 extracted from espacenet.com database on Apr. 20, 2022, 17 pages.
English language abstract for CN 101938944 A extracted from espacenet.com database on May 4, 2022, 2 pages.
English language abstract for CN 102946812 A extracted from espacenet.com database on May 4, 2022, 1 page.
English language abstract for CN 104755033 A extracted from espacenet.com database on May 4, 2022, 2 pages.
English language abstract for CN 1126430 A extracted from espacenet.com database on May 4, 2022, 2 pages.
English language abstract for EP 3 139 835 B1 extracted from espacenet.com database on Aug. 17, 2021, 2 pages.
English language abstract for JP 2001-149485 A extracted from espacenet.com database on May 4, 2022, 2 pages.
English language abstract for JP 2005-512678 A extracted from espacenet.com database on May 4, 2022, 2 pages.
English language abstract for JP 2005-532134 A extracted from espacenet.com database on May 4, 2022, 1 page.
English language abstract for JP 2010-504835 A extracted from espacenet.com database on May 4, 2022, 1 page.
English language abstract for JP 2013-515417 A extracted from espacenet.com database on May 4, 2022, 2 pages.
English language abstract for JP 2013-538603 A extracted from espacenet.com database on May 4, 2022, 2 pages.
English language abstract for JPH 07-502913 A extracted from espacenet.com database on May 4, 2022, 2 pages.
English language abstract for JPS 62-243557 A extracted from espacenet.com database on May 4, 2022, 1 page.
English language abstract for WO 2007/004603 A1 extracted from espacenet.com database on May 4, 2022, 1 page.

(56) References Cited

OTHER PUBLICATIONS

English language abstract for WO 2008/044679 A1 extracted from espacenet.com database on May 9, 2022, 2 pages.
English language abstract for WO 2018/092944 A1 extracted from espacenet.com database on Apr. 20, 2022, 2 pages.
English language abstract for WO 2020/004660 A1 extracted from espacenet.com database on Aug. 17, 2021, 2 pages.
English language abstract only (original document unavailable) for AU 201616964 S extracted from espacenet.com database on May 4, 2022, 1 page.
English language abstract only (original document unavailable) for AU 201616965 S extracted from espacenet.com database on May 4, 2022, 1 page.

* cited by examiner

GYROSCOPE BIAS ESTIMATION

CROSS-REFERENCE TO RELATED APPLICATIONS

This application is the National Stage of International application no. PCT/IB2020/059716, filed Oct. 15, 2020, which claims the benefit of priority from United Kingdom patent application no. 1915137.2, filed Oct. 18, 2019, which are incorporated by reference herein in their entirety.

BACKGROUND

This invention relates to a method for determining a current estimated gyroscope bias of a gyroscope and a mobile device configured to implement the method.

There is a growing popularity for devices that measure movement. These sensing devices could be in the form of wearable devices that measure movement of a user, a smartphone that is carried by the user to measure movement of the user or moveable devices that can generally sense movement, for instance video game controllers or sensors attached to industrial equipment.

These moveable sensing devices may include a satellite positioning sensor which can sense the location of the device, and motion sensors sense motion of the device. These motion sensors may include one or more of an accelerometer, a gyroscope, a magnetometer, a compass and a barometer. These motion sensors can output data that can be used to calculate the motion of the moveable device. One problem with these sensors, and, in particular, a gyroscope, is that they are prone to having an error associated with their measured movement. This means that the data that they output is not fully representative of the movement being sensed by the sensing device at a given time. There will be a component to the data output that is representative of the movement of the sensing device and a component to the data output that is an error to the sensed movement. One source of error is typically known as an offset or bias. (For simplicity, it will be referred to as a bias from now on.) For instance, when the sensing device is stationary it may continue to output data that indicates that the sensing device is moving in a particular direction. The bias tends to change over time as the gyroscope is moved around. Therefore, the bias needs to be detected and corrected for as the device is being used.

There are methods that look to correct for the drift of a gyroscope that make use of the combined sensed data of a gyroscope together with at least one accelerometer and magnetometer. The other two provide an estimate of when the moveable device is at rest and then this information can be used to detect the current bias of the gyroscope. Such methods require other motion sensors to be used in combination with the gyroscope to correct for the bias of the gyroscope. In addition, these methods can be computationally complicated because they rely on processing data from multiple motion sensors at the same time.

It would therefore be desirable for there to be an improved method of calculating the current bias of a gyroscope.

DETAILED DESCRIPTION

According to a first aspect of the present invention there is provided a method for determining a current estimated gyroscope bias of a gyroscope, the gyroscope being configured to output rotation rate data, the method comprising: receiving first rotation rate data associated with a first time from the gyroscope, the first rotation rate data comprising a first rotation rate reading that indicates a rotation rate of the gyroscope about a first axis; calculating a rotation rate moving average associated with the first time based on the first rotation rate data and a rotation rate moving average associated with a second time earlier than the first time; calculating a moving standard deviation associated with the first time based on the first rotation rate data, the rotation rate moving average associated with the first time, and a moving standard deviation associated with the second time; determining if the moving standard deviation associated with the first time is less a threshold moving standard deviation; and in response the moving standard deviation being less than the threshold moving standard deviation, using the first rotation rate reading to update the current estimated gyroscope bias.

The first rotation rate data may comprise a second rotation rate reading that indicates a rotation rate of the gyroscope about a second axis. The rotation rate data may comprise a third rotation rate reading that indicates a rotation rate of the gyroscope about a third axis. The first axis and second axis and/or third axis may be orthogonal to each other. The method may comprise: calculating a separate rotation rate moving average associated with the first time for each rotation axis based on the respective rotation rate reading and the rotation rate moving average for the respective rotation axis associated with the second time; calculating a separate moving standard deviation associated with first time for each rotation axis based on the respective rotation rate reading, the rotation rate moving average for the respective rotation axis associated with the second time, and a moving standard deviation for the respective rotation axis associated with the second time; combining the moving standard deviations associated with the first time; determining if the combined moving standard deviation associated with the first time is less the threshold moving standard deviation; and in response the combined moving standard deviation being less than the threshold moving standard deviation, using the rotation rate readings of the first rotation rate data to update the current estimated gyroscope bias. Combining the moving standard deviations associated with the first time may comprise summing the moving standard deviations associated with the first time.

Calculating the rotation rate moving average may comprise reducing the rotation rate moving average associated with the second time using a moving average forget rate factor, and combining the reduced rotation rate moving average with the respective rotation rate reading. Calculating the rotation rate moving average may comprise reducing the respective rotation rate reading using the moving average forget rate factor, and combining the reduced rotation rate moving average with the respective reduced rotation rate reading. Reducing the respective rotation rate reading may comprise multiplying the respective rotation rate reading with the moving average forget rate factor. Reducing the rotation rate moving average associated with the second time may comprise subtracting from the rotation rate moving average the rotation rate moving average multiplied with the moving average forget rate factor.

Calculating the moving standard deviation may comprise reducing the moving standard deviation associated with the second time using a moving standard deviation forget rate factor, and combining the reduced moving standard deviation with the difference between the respective rotation rate reading and the respective rotation rate moving average. The difference between the rotation rate reading and the respective rotation rate moving average may be the magnitude of this difference. Calculating the moving standard deviation may comprise reducing the difference between the rotation rate reading and the rotation rate moving average using the moving standard deviation forget rate factor, and combining the reduced moving standard deviation with the reduced difference. Reducing the difference between the rotation rate reading and the rotation rate moving average may comprise multiplying the difference with the moving standard deviation forget rate factor. Reducing the moving standard deviation associated with the second time may comprise subtracting from the moving standard deviation the moving standard deviation multiplied with the moving standard deviation forget rate factor.

Using the first rotation rate reading to update the current estimated gyroscope bias may comprise setting the first rotation rate reading as the current estimated gyroscope bias. Using the rotation rate readings of the first rotation rate data to update the current estimated gyroscope bias may comprise setting the rotation rate readings of the first rotation rate data as the current estimated gyroscope bias.

Using the first rotation rate reading to update the current estimated gyroscope bias may comprise combining a previous estimated gyroscope bias with the first rotation rate reading. Using the rotation rate readings of the first rotation rate data to update the current estimated gyroscope bias may comprise combining a previous estimated gyroscope bias with the rotation rate readings of the first rotation data.

According to a second aspect of the present invention there is provided a mobile device comprising: a gyroscope configured to output rotation rate data, the gyroscope having a gyroscope bias; and a processor configured to: receive first rotation rate data associated with a first time from the gyroscope, the first rotation rate data comprising a first rotation rate reading that indicates the rotation rate of the gyroscope about a first axis; calculate a rotation rate moving average associated with the first time based on the first rotation rate data and a rotation rate moving average associated with a second time earlier than the first time; calculate a moving standard deviation associated with the first time based on the first rotation rate data, the rotation rate moving average associated with the first time and a moving standard deviation associated with the second time; determine if the moving standard deviation associated with the first time is less a threshold moving standard deviation; and in response the moving standard deviation being less than the threshold moving standard deviation, use the first rotation rate reading to update a current estimate of the gyroscope bias.

The present invention will now be described by way of example with reference to the accompanying drawings. In the drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a method for determining a current estimated gyroscope bias of a gyroscope, the gyroscope being configured to output rotation rate data. The method comprises receiving first rotation rate data for a first time from the gyroscope, the first rotation rate data comprising a first rotation rate reading that indicates the rotation rate of the gyroscope about a first axis. The method further comprises calculating a rotation rate moving average for first time based on the first rotation rate data and a rotation rate moving average for a second time earlier than the first time. The method further comprises calculating a moving standard deviation for the first time based on the first rotation rate data, the rotation rate moving average for the first time and a moving standard deviation for the second time. The method further comprises determining if the moving standard deviation for the first time is less a threshold moving standard deviation, and in response the moving standard deviation being less than the threshold moving standard deviation, using the first rotation rate reading to update the current estimated gyroscope bias.

Figure 1:
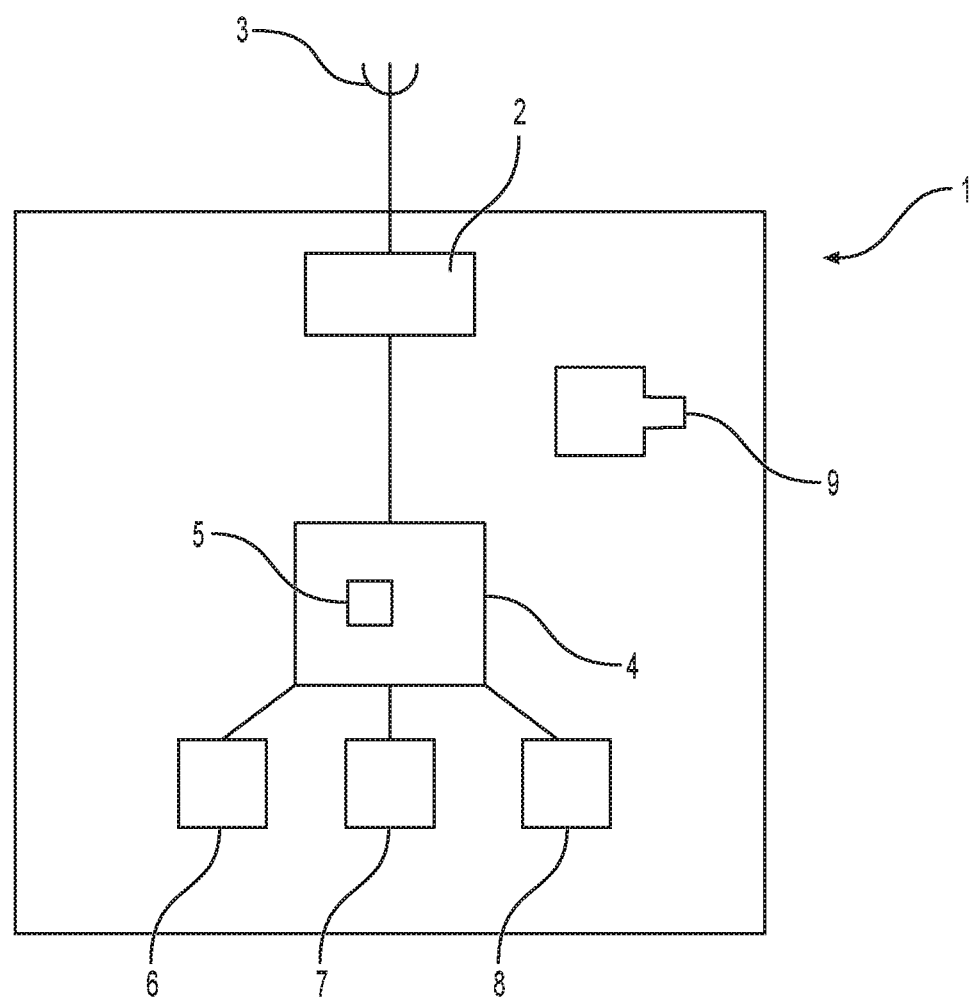
FIG. 1 shows a schematic diagram of a mobile device.

FIG. 1 shows a schematic diagram of a mobile device 1. The mobile device comprises at least one wireless communication unit 2. The wireless communication unit 2 is connected to an antenna 3.

The mobile device comprises a processor 4 and a non-volatile memory 5. The mobile device 1 may comprise more than one processor 4 and more than one memory 5. The memory 5 stores a set of program instructions that are executable by the processor, and reference data such as look-up tables that can be referenced by the processor in response to those instructions. The processor 4 may be configured to operate in accordance with a computer program stored in non-transitory form on a machine-readable storage medium. The memory 5 may be the machine-readable storage medium. The computer program may store instructions for causing the processor to perform the method described herein.

The processor 4 may be connected to the wireless communication unit(s) 2 to permit communication between them. The processor 4 may use at least one wireless communication unit to send and/or receive data over a wireless communication network. For instance, the wireless communication unit(s) 2 may be:

- A cellular communication unit configured to send and receive data over a cellular communication network. The cellular communication unit may be configured to communicate with cellular base stations to send and receive data.
- A Wi-Fi communication unit configured to send and receive data over a wireless communication network such as a Wi-Fi network. The Wi-Fi communication unit may be configured to communicate with wireless base stations to send and receive data.
- A Bluetooth communication unit configured to send and receive data over a Bluetooth communication network. The Bluetooth communication network may be configured to communicate with other Bluetooth devices to send and receive data.
- A global navigation satellite system communication unit configured to receive data from at least one satellite that emits a positioning signal. The global navigation satellite system that the satellites are part of may be any satellite navigation system such as GPS, GLONASS, Galileo or a combination of systems.

It will be appreciated that the wireless communication unit(s) may be configured to communicate using other wireless protocols.

One or more of the wireless communication units 2 may be part of processor 4. Part or all of a wireless communication unit's function may be implemented by processor 4 by processor running software to process signals received by an antenna 3.

The mobile device 1 may comprise a power source 9 such as a battery. The mobile device 1 may accept an external power supply to enable the power source 9 to be charged. The mobile device 1 may also comprise a display. The mobile device 1 may be configured to display information on the display. The mobile device 1 may also comprise a user interface. The user interface may be configured to permit a user of the device to interact with the mobile device 1. The user interface may at least in part be formed as part of the display. For instance, the display may be a touch screen and display buttons and other interactive features of the display that the user can interact with by touching the touch screen.

The mobile device 1 comprises at least one movement sensor. The processor 4 is connected to the movement sensors to permit communication between them. The processor 4 can receive movement data from the movement sensors. The movement sensors may comprise at least one accelerometer, a magnetometer, and/or a gyroscope. The processor 4 can use the movement data from the movement sensors to derive information about the current movement and orientation of the mobile device.

The mobile device may comprise at least one accelerometer 6. The accelerometer may calculate the acceleration rate that the device 1 is being moved in a direction. The accelerometer may output time series data of acceleration readings in the direction that the accelerometer 6 gathers data. The device 1 may comprise more than one accelerometer 6. The accelerometers 6 may be orientated so as to gather acceleration readings in different directions. The accelerometers 6 may gather acceleration readings in orthogonal directions. The device may comprise three accelerometers 6 each gathering acceleration readings in different, orthogonal directions. The processor 4 can receive the time series data of acceleration readings from the at least one accelerometer.

The mobile device may comprise a magnetometer 7. The magnetometer may calculate the orientation of the device 1 relative to the local magnetic field of the Earth. This can be used to derive data concerning the movement of the device 1 relative to the surface of the Earth. The magnetometer may be a hall effect sensor that detects the magnetic field of the Earth. The magnetometer 7 may output time series data of rotation movement readings relative to the magnetic field of the Earth. The processor 4 can receive the time series data of rotation movement readings.

The mobile device 1 comprises a gyroscope 8. The gyroscope 8 may be a MEMS gyroscope. The gyroscope 8 may calculate the rate of rotation about a rotation axis that the device 1 is being moved about. The gyroscope 8 may output time series data of rotation rate readings about the rotation axis that the gyroscope 8 gathers data. The time series data of rotation rate readings may be rotation rate data. The gyroscope 8 may gather data about the rate of rotation about more than one rotation axis that the device 1 is being moved about. The gyroscope 8 may calculate the rate of rotation about two rotation axes that the device 1 is being moved about. The gyroscope 8 may calculate the rate of rotation about three rotation axes that the device 1 is being moved about. Thus, the gyroscope 8 may be a triaxial gyroscope. The rotation axes may be orthogonal to each other. The gyroscope 8 may output time series data of rotation rate readings about each rotation axis that the gyroscope 8 gathers data. The time series comprise rotation reading(s) at each time step in the time series. The processor 4 can receive the time series data of rotation rate readings about one or more axes.

The rotation rate readings output by the gyroscope 8 generally include a small bias in the average rotation rate readings output even when there is no movement of the mobile device 1. This bias means that the rotation rate readings each include a first rotation rate component which is the actual rotation of the mobile device 1 about the measured axis or axes at that time step and a second rotation rate component which is the gyroscope bias at that time step. The gyroscope bias can change over time due to changes in the physical properties of the gyroscope 8 over time. The rotation rate readings may include other noise due to other errors in the measurement process undertaken by the gyroscope 8.

Figure 2:
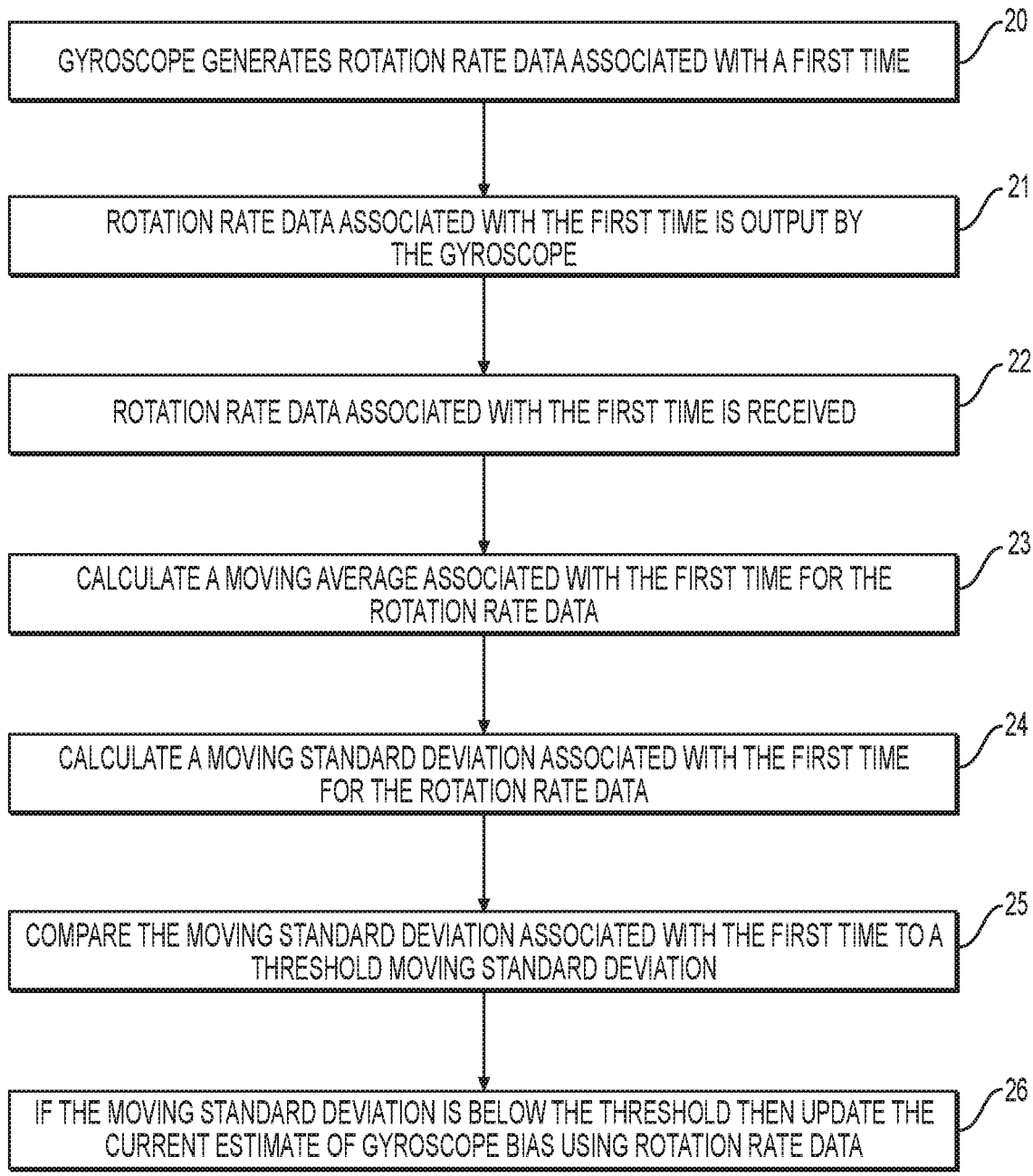
FIG. 2 shows a flow chart of a method for estimating a gyroscope bias of a gyroscope.

It is therefore important that if the mobile device 1 is going to use the rotation rate data output by the gyroscope 8 that the bias in the rotation rate data is corrected for. Generally speaking the gyroscope bias cannot be completely corrected at each time step however as the bias generally changes at a slow rate compared to the time period of each time step an estimate of the current bias of the gyroscope can be calculated and used for a period of time until an update to the estimate of the current bias can be recalculated. A method for calculating an estimate of gyroscope bias of the gyroscope will now be described with reference to FIG. 2. This method may be undertaken by processor 4 in response to receiving the time series data of rotation rate readings about one or more axes from the gyroscope.

As shown at step 20, rotation rate data for a first time is generated by the gyroscope 8. As discussed herein, the gyroscope 8 may output rotation rate data concerning sensed rotation about one or more rotation axes. The rotation rate data for a first time comprises a first rotation rate reading that indicates the rotation rate of the mobile device about a first axis. The rotation rate data for a first time may comprise a second rotation rate reading that indicates the rotation rate of the mobile device about a second axis. The rotation rate data for a first time may comprise a third rotation rate reading that indicates the rotation rate of the mobile device about a third axis. As discussed herein the axes may be orthogonal to each other.

As shown at step 21, the rotation rate data for a first time is output by the gyroscope 8.

As shown at step 22, the rotation rate data is received for further processing. It may be received by the processor 4 for further processing.

As shown at step 23, a moving average, associated with the first time, of the rotation rate data is calculated based on the rotation rate data for the first time.

Where the rotation rate data for the first time is the first, and only, rotation rate data output from the gyroscope 8 that is available for calculating the moving average then the moving average may be set to the first rotation rate data.

Where a moving average for a second time prior to the first time has already been calculated based on rotation rate data for the second time, then the moving average for the first time is calculated based on the moving average for the second time and the rotation rate data for the first time. The moving average may be calculated by reducing the previous moving average using a predefined forget rate factor $\alpha_\mu$ for the moving average and combining the reduced previous moving average with the rotation rate data for the first time. The rotation rate data for the first time may also be reduced using the predefined forget rate factor $\alpha_\mu$ prior to combining the reduced previous moving average with the rotation rate data for the first time. The moving average may be calculated by adding the reduced previous moving average to the reduced rotation rate data for the first time. The previous moving average may be reduced by subtracting from the previous moving average the previous moving average multiplied by the predefined forget rate factor $\alpha_\mu$. The rotation rate data for the first time may be reduced by multiplying the rotation rate data for the first time by the predefined forget rate factor $\alpha_\mu$. Where the rotation rate data comprises rotation rate data about more than one rotation axis then a separate moving average is calculated for each rotation axis.

The moving average of the rotation rate data may be calculated at time t by:

$$\mu_t = (1-\alpha_\mu)\mu_{t-1} + \alpha_\mu n_t$$

where $n_t$ is the rotation rate data at time t, $\mu_t$ is the moving average at time t, and $\alpha_\mu$ is the moving average forget rate. The moving average may therefore be an exponential moving average.

The moving average forget rate may take a value between 0 and 1. The moving average forget rate may be 0.01, 0.02, 0.03, 0.04, 0.05, 0.1 or 0.2. Preferably, the moving average forget rate may be 0.01, 0.02, 0.03, 0.04 or 0.05. More preferably, the moving average forget rate may be 0.01, 0.02 or 0.03. The moving average forget rate may be 0.02. The moving average forget rate may be set based on the empirical performance of the method.

The moving average of the rotation rate data therefore indicates the average rotation rate about a particular rotation axis over a period of time. This can be used to give an indication of whether the rotation rate is changing over time. As shown in step 24, a moving standard deviation, associated with the first time, of the rotation rate data is calculated based on the moving average for the first time and the rotation rate data for the first time.

Where the rotation rate data for the first time is the first, and only, rotation rate data output from the gyroscope 8 that is available for use in calculations then the moving standard deviation may be zero. Alternatively, the moving standard deviation may be initialised to another value. For instance, the standard deviation may be initialised to 1 for each rotation axis that is present in the rotation rate data. This means that even if the device is still initially there will be a period of time before the estimate of the bias starts to be updated.

Where there has been rotation rate data collected over more than one time step, then the moving standard deviation for the first time is calculated based on the moving average for the first time, the rotation rate data for the first time and the moving standard deviation for the second time. The moving standard deviation may be calculated by reducing the previous moving standard deviation using a predefined forget rate factor $\alpha_\sigma$ for the moving standard deviation and combining the reduced previous moving standard deviation with the difference between the rotation rate data for the first time and the moving average for the first time. The difference between the rotation rate data for the first time and the moving average for the first time may be the magnitude of this difference. The difference between the rotation rate data for the first time and the moving average for the first time may also be reduced using the predefined forget rate factor $\alpha_\sigma$ prior to combining the reduced previous moving standard deviation with the difference between the rotation rate data for the first time and the moving average for the first time. The previous moving standard deviation may be reduced by subtracting from the previous moving standard deviation the previous moving standard deviation multiplied by the predefined forget rate factor $\alpha_\sigma$. The difference between the rotation rate data for the first time and the moving average for the first time may be reduced by multiplying the difference between the rotation rate data for the first time and the moving average for the first time by the predefined forget rate factor $\alpha_\sigma$. Where the rotation rate data comprises rotation rate data about more than one rotation axis then a separate moving standard deviation is calculated for each rotation axis.

The moving standard deviation may be calculated at time t by:

$$\sigma_t = (1-\alpha_\sigma)\sigma_{t-1} + \alpha_\sigma |n_t - \mu_t|$$

where $n_t$ is the rotation rate data at time t, $\mu_t$ is the moving average at time t, $\sigma_t$ is the moving standard deviation and $\alpha_\sigma$ is the moving standard deviation forget rate. The moving standard deviation may therefore be an exponential moving standard deviation.

The moving standard deviation forget rate may take a value between 0 and 1. The moving standard deviation forget rate may be 0.01, 0.02, 0.03, 0.04, 0.05, 0.1 or 0.2. Preferably, the moving standard deviation forget rate may be 0.01, 0.02, 0.03, 0.04 or 0.05. More preferably, the moving standard deviation forget rate may be 0.01, 0.02 or 0.03. The moving standard deviation forget rate may be 0.02. The moving standard deviation forget rate may be set based on the empirical performance of the method.

As shown in step 25, the moving standard deviation is compared to a predefined threshold moving standard deviation. Where the rotation rate data comprises rotation rate data about more than one rotation axis then the moving standard deviations for the first time for each rotation axis may be combined together before comparing the combined moving standard deviations to the predefined threshold moving standard deviation. The moving standard deviations for the first time for each rotation axis may be combined together by summing the moving standard deviations together. The threshold moving standard deviation may be between 0.002 and 0.012 radians per second. Preferably, the threshold moving standard deviation may be 0.002, 0.004, 0.006, 0.008, 0.010 or 0.012 radians per second. Preferably, the threshold moving standard deviation may be between 0.04 and 0.08 radians per second. More preferably the threshold moving standard deviation may be 0.006 radians per second.

s shown at step 26, if the moving standard deviation, or combined moving standard deviation, is below the predefined threshold moving standard deviation, then the mobile device is judged to be stationary. In this case, the rotation rate readings at the first time are used to calculate an estimate of the current bias of the gyroscope.

In one case, the rotation rate readings at the first time are taken to be an estimate of the current bias of the gyroscope. In this case, the rotation rate readings at the first time are therefore stored as the estimate of the current gyroscope bias of the gyroscope 8.

In another case, the rotation rate readings at the first time are used to update an estimate of the current bias of the gyroscope. An estimate of the current bias of the gyroscope may be calculated at each time step. For time steps where the moving standard deviation, or combined moving standard deviation is below the predefined threshold moving standard deviation, the estimate of the current bias of the gyroscope can be updated using the rotation rate readings at the first time. The estimate of the current bias of the gyroscope may be updated by combining an estimate of the bias of the gyroscope with the rotation rate readings at the first time. The combination may take into account the relative certainties of the estimate of the bias of the gyroscope and the rotation rate readings at the first time. The estimate of the current bias of the gyroscope may be calculated using a Kalman filter. The estimate of the current bias of the gyroscope may assume that the bias of the gyroscope undergoes a random walk at each time step. When rotation rate readings are available for time steps where the mobile device is judged to be stationary, these rotation rate readings are combined with the current bias calculated by the Kalman filter to provide an updated estimate of the current bias of the gyroscope. The use of the Kalman filter can smooth the update of the estimate of the current bias of the gyroscope so that it does not jump between values too quickly.

If the moving standard deviation is equal to or above the predefined threshold moving standard deviation, then the mobile device is judged to be non-stationary. In this case, the current estimate of the gyroscope bias is not updated at this time step using the rotation rate readings for that time step.

In subsequent calculations that use the rotation rate data, the current estimated gyroscope bias is applied to the rotation rate data to at least partially remove the second rotation rate component. As the current estimated gyroscope bias may differ from the actual gyroscope bias at that point, the second component may not be removed completely. The mobile device may use the rotation rate data, and optionally together with data from the accelerometer(s) 6 and magnetometer 7, to calculate the current orientation and/or movement direction of the mobile device.

The method may be repeated at each time step with the moving average and moving standard deviation calculated at the previous time step forming the moving average and moving standard deviation from the earlier time step. In this way, the data from the gyroscope can be continuously monitored for time steps that have data that indicate that the gyroscope is stationary so that the estimate of the current gyroscope bias can be updated.

The above method to estimate the current gyroscope bias only use data received from the gyroscope 8. The method does not take as an input data from the accelerometer(s) 6 or the magnetometer 7. This is advantageous because the current method is computationally much lighter than a method that estimates gyroscope bias using the gyroscope data together with data from the accelerometer(s) 6 and the magnetometer 7. Usually such a method uses a Kalman filter to process the movement data received from the gyroscope 8, accelerometer(s) 6 and the magnetometer and estimate states when the mobile device is stationary. This is much more involved set of calculations computationally than the presently described method.

The mobile device 1 may be a smartphone, a wearable device, and/or a monitoring device that can be attached to a moveable object.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for determining a current estimated gyroscope bias of a gyroscope, the gyroscope being configured to output rotation rate data, the method comprising:
receiving first rotation rate data associated with a first time from the gyroscope, the first rotation rate data comprising a first rotation rate reading that indicates a rotation rate of the gyroscope about a first axis;
calculating a rotation rate moving average associated with the first time based on the first rotation rate data and a rotation rate moving average associated with a second time earlier than the first time;
calculating a moving standard deviation associated with the first time based on the first rotation rate data, the rotation rate moving average associated with the first time, and a moving standard deviation associated with the second time;
determining if the moving standard deviation associated with the first time is less a threshold moving standard deviation;
in response the moving standard deviation being less than the threshold moving standard deviation, using the first rotation rate reading to update the current estimated gyroscope bias;
wherein the first rotation rate data comprises a second rotation rate reading that indicates a rotation rate of the gyroscope about a second axis;
calculating a separate rotation rate moving average associated with the first time for each axis based on the rotation rate reading for each axis and the rotation rate moving average for each axis associated with the second time;
calculating a separate moving standard deviation associated with the first time for each axis based on the rotation rate reading for each axis, the rotation rate moving average for each axis associated with the second time, and a moving standard deviation for each axis associated with the second time;
combining the moving standard deviations associated with the first time;
determining if the combined moving standard deviation associated with the first time is less the threshold moving standard deviation; and
in response the combined moving standard deviation being less than the threshold moving standard deviation, using the first rotation rate reading of the first rotation rate data to update the current estimated gyroscope bias.

2. The method as claimed in claim 1, wherein the first rotation rate data comprises a third rotation rate reading that indicates a rotation rate of the gyroscope about a third axis.

3. The method as claimed in claim 2, wherein the first axis and second axis and/or third axis are orthogonal to each other.

4. The method as claimed in claim 1, wherein combining the moving standard deviations associated with the first time comprises summing the moving standard deviations associated with the first time.

5. The method as claimed in claim 1, wherein calculating the rotation rate moving average comprises reducing the rotation rate moving average associated with the second time using a moving average forget rate factor, and combining the reduced rotation rate moving average with the first rotation rate reading.

6. The method according to claim 5, wherein calculating the rotation rate moving average comprises reducing the first rotation rate reading using the moving average forget rate factor, and combining the reduced rotation rate moving average with the reduced rotation rate reading for the same axis.

7. The method according to claim 6, wherein reducing the first rotation rate reading comprises multiplying the first rotation rate reading with the moving average forget rate factor.

8. The method according to claim 5, wherein reducing the rotation rate moving average associated with the second time comprises subtracting from the rotation rate moving average the rotation rate moving average multiplied with the moving average forget rate factor.

9. The method according to claim 1, wherein using the first rotation rate reading to update the current estimated gyroscope bias comprises setting the first rotation rate reading as the current estimated gyroscope bias.

10. The method according claim 1, wherein using the first rotation rate reading to update the current estimated gyroscope bias comprises setting the first rotation rate reading of the first rotation rate data as the current estimated gyroscope bias for the first axis.

11. The method according to claim 1, wherein using the first rotation rate reading to update the current estimated gyroscope bias comprises combining a previous estimated gyroscope bias with the first rotation rate reading.

12. The method according to claim 1, wherein using the first rotation rate reading of the first rotation rate data to update the current estimated gyroscope bias for the first axis comprises combining a previous estimated gyroscope bias for the first axis with the first rotation rate reading of the first rotation rate data.

13. A method for determining a current estimated gyroscope bias of a gyroscope, the gyroscope being configured to output rotation rate data, the method comprising:
   receiving first rotation rate data associated with a first time from the gyroscope, the first rotation rate data comprising a first rotation rate reading that indicates a rotation rate of the gyroscope about a first axis;
   calculating a rotation rate moving average associated with the first time based on the first rotation rate data and a rotation rate moving average associated with a second time earlier than the first time;
   calculating a moving standard deviation associated with the first time based on the first rotation rate data, the rotation rate moving average associated with the first time, and a moving standard deviation associated with the second time;
   determining if the moving standard deviation associated with the first time is less a threshold moving standard deviation; and
   in response the moving standard deviation being less than the threshold moving standard deviation, using the first rotation rate reading to update the current estimated gyroscope bias;
   wherein calculating the moving standard deviation comprises reducing the moving standard deviation associated with the second time using a moving standard deviation forget rate factor, and combining the reduced moving standard deviation with a difference between the first rotation rate reading and the rotation rate moving average associated with the first time.

14. The method according to claim 13, wherein the difference between the first rotation rate reading and the rotation rate moving average associated with the first time is a magnitude of this difference.

15. The method according to claim 13, wherein calculating the moving standard deviation comprises reducing the difference between the first rotation rate reading and the rotation rate moving average using the moving standard deviation forget rate factor, and combining the reduced moving standard deviation with the reduced difference.

16. The method according to claim 15, wherein reducing the difference between the rotation rate reading and the rotation rate moving average comprises multiplying the difference with the moving standard deviation forget rate factor.

17. The method according to claim 13, wherein reducing the moving standard deviation associated with the second time comprises subtracting from the moving standard deviation the moving standard deviation multiplied with the moving standard deviation forget rate factor.

18. A mobile device comprising:
   a gyroscope configured to output rotation rate data, the gyroscope having a gyroscope bias; and
   a processor configured to:
      receive first rotation rate data associated with a first time from the gyroscope, the first rotation rate data comprising a first rotation rate reading that indicates a rotation rate of the gyroscope about a first axis;
      calculate a rotation rate moving average associated with the first time based on the first rotation rate data and a rotation rate moving average associated with a second time earlier than the first time;
      calculate a moving standard deviation associated with the first time based on the first rotation rate data, the rotation rate moving average associated with the first time and a moving standard deviation associated with the second time;
      determine if the moving standard deviation associated with the first time is less a threshold moving standard deviation;
      in response the moving standard deviation being less than the threshold moving standard deviation, use the first rotation rate reading to update a current estimate of the gyroscope bias;
      wherein the first rotation rate data comprises a second rotation rate reading that indicates a rotation rate of the gyroscope about a second axis;
      calculating a separate rotation rate moving average associated with the first time for each axis based on the rotation rate reading for each axis and the rotation rate moving average for the axis for each axis associated with the second time;
      calculating a separate moving standard deviation associated with the first time for each axis based on the rotation rate reading for each axis, the rotation rate moving average for each axis associated with the second time, and a moving standard deviation for each axis associated with the second time;
      combining the moving standard deviations associated with the first time;
      determining if the combined moving standard deviation associated with the first time is less the threshold moving standard deviation; and
      in response the combined moving standard deviation being less than the threshold moving standard deviation, using the first rotation rate reading of the first rotation rate data to update the current estimated gyroscope bias.

* * * * *